(12) United States Patent
Stander et al.

(10) Patent No.: US 12,013,702 B2
(45) Date of Patent: *Jun. 18, 2024

(54) MACHINE DUMP BODY CONTROL USING OBJECT DETECTION

(71) Applicant: Deere & Company, Moline, IL (US)

(72) Inventors: Francois Stander, Dubuque, IA (US);
Joel D. Banninga, Dubuque, IA (US);
Michael J. Schmidt, Asbury, IA (US);
Maryanne E. Graves, LeClaire, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,200

(22) Filed: Apr. 18, 2023

(65) Prior Publication Data

US 2023/0251664 A1 Aug. 10, 2023

Related U.S. Application Data

(63) Continuation of application No. 16/803,603, filed on Feb. 27, 2020, now Pat. No. 11,693,411.

(51) Int. Cl.
*G05D 1/02* (2020.01)
*B60Q 9/00* (2006.01)
(Continued)

(52) U.S. Cl.
CPC ........... *G05D 1/0214* (2013.01); *B60Q 9/008* (2013.01); *E02F 9/262* (2013.01); *G01S 13/931* (2013.01); *G05D 1/0238* (2013.01)

(58) Field of Classification Search
CPC ............... G05D 1/0214; G05D 1/0238; G05D 2201/0202; G05D 2201/0213;
(Continued)

(56) References Cited

U.S. PATENT DOCUMENTS 6,735,888 B2   5/2004   Green et al.
7,516,563 B2   4/2009   Koch
(Continued)

FOREIGN PATENT DOCUMENTS

CN    108549771 A     9/2018
DE    102017215379 A1  3/2019
(Continued)

OTHER PUBLICATIONS

U.S. Appl. No. 16/561,556 Non Final Office Action dated Jun. 21, 2023, 17 pages.
(Continued)

*Primary Examiner* — Peter D Nolan
*Assistant Examiner* — Demetra R Smith-Stewart
(74) *Attorney, Agent, or Firm* — Christopher J. Volkmann; Kelly, Holt & Christenson, PLLC.

(57) ABSTRACT

A mobile work machine includes a frame, a material loading system having a material receiving area configured to receive material and an actuator configured to control the material loading system to move the material receiving area relative to the frame, and a control system configured to receive an indication of a detected object, determine a location of the object relative to the material loading system, and generate a control signal that controls the mobile work machine based on the determined location.

20 Claims, 8 Drawing Sheets

(51) Int. Cl.
*E02F 9/26* (2006.01)
*G01S 13/931* (2020.01)
*G05D 1/00* (2006.01)

(58) Field of Classification Search
CPC ..... B60Q 9/008; B60Q 2800/20; E02F 9/262; E02F 9/225; E02F 9/205; E02F 9/261; E02F 3/437; E02F 3/434; G01S 13/931; G01S 13/88; G01S 15/88; G01S 15/931; G01S 17/88; G01S 17/931; B60P 1/04
See application file for complete search history.

(56) References Cited

U.S. PATENT DOCUMENTS

| | | | |
|---|---|---|---|
| 9,598,036 B2 | 3/2017 | Lim et al. | |
| 9,745,721 B2 | 8/2017 | Linstroth et al. | |
| 10,414,634 B2 * | 9/2019 | Palmroth | E02F 3/437 |
| 10,829,911 B2 | 11/2020 | Kennedy et al. | |
| 2004/0140923 A1 | 7/2004 | Tucker et al. | |
| 2004/0210370 A1 | 10/2004 | Gudat et al. | |
| 2009/0043462 A1 | 2/2009 | Stratton et al. | |
| 2009/0293322 A1 | 12/2009 | Faivre et al. | |
| 2012/0237083 A1 | 9/2012 | Lange et al. | |
| 2012/0327261 A1 | 12/2012 | Tafazoli Bilandi et al. | |
| 2013/0054097 A1 | 2/2013 | Montgomery | |
| 2013/0103271 A1 | 4/2013 | Best et al. | |
| 2014/0107895 A1 | 4/2014 | Faivre et al. | |
| 2014/0188333 A1 | 7/2014 | Friend | |
| 2014/0208728 A1 | 7/2014 | Ma et al. | |
| 2014/0257647 A1 | 9/2014 | Wu et al. | |
| 2014/0354813 A1 | 12/2014 | Ishimoto | |
| 2015/0249821 A1 | 9/2015 | Tanizumi et al. | |
| 2016/0138248 A1 | 5/2016 | Conway et al. | |
| 2016/0176338 A1 | 6/2016 | Husted et al. | |
| 2016/0244949 A1 | 8/2016 | Kanemitsu | |
| 2016/0305784 A1 | 10/2016 | Roumeliotis et al. | |
| 2016/0377437 A1 | 12/2016 | Brannstrom et al. | |
| 2017/0220044 A1 | 8/2017 | Sakai et al. | |
| 2018/0137446 A1 | 5/2018 | Shike et al. | |
| 2018/0277067 A1 | 9/2018 | Tentinger et al. | |
| 2018/0373966 A1 | 12/2018 | Beschorner et al. | |
| 2019/0194913 A1 | 6/2019 | Petrany et al. | |
| 2019/0218032 A1 | 7/2019 | Whitfield, Jr. et al. | |
| 2019/0302794 A1 | 10/2019 | Kean et al. | |
| 2020/0071912 A1 | 3/2020 | Kennedy et al. | |
| 2020/0269695 A1 | 8/2020 | Pfaff et al. | |
| 2020/0310442 A1 | 10/2020 | Halder et al. | |
| 2020/0325650 A1 | 10/2020 | Tsukamoto et al. | |
| 2020/0347580 A1 | 11/2020 | Raszga et al. | |
| 2020/0353916 A1 | 11/2020 | Schwartz et al. | |
| 2021/0002850 A1 | 1/2021 | Wu | |
| 2021/0071390 A1 | 3/2021 | Kean | |
| 2021/0071393 A1 | 3/2021 | Kean | |
| 2021/0094539 A1 * | 4/2021 | Beller | G05D 1/0221 |
| 2021/0230841 A1 | 7/2021 | Kurosawa | |
| 2021/0271248 A1 | 9/2021 | Stander et al. | |

FOREIGN PATENT DOCUMENTS

| | | |
|---|---|---|
| DE | 102017222966 A1 | 6/2019 |
| DE | 102018209336 A1 | 12/2019 |
| EP | 2631374 A1 | 8/2013 |
| EP | 3399109 A1 | 11/2018 |
| JP | H0971965 A | 3/1997 |
| JP | 2008101416 A | 5/2008 |
| JP | 2015195457 A | 3/2018 |
| JP | 6389087 B2 | 9/2018 |
| JP | 2019194074 A | 11/2019 |
| WO | WO2009086601 A1 | 7/2009 |
| WO | WO2015121818 A2 | 8/2015 |

OTHER PUBLICATIONS

Final Office Action for U.S. Appl. No. 16/561,556 dated Oct. 23, 2023, 19 pages.
Prosecution History for U.S. Appl. No. 16/122,121 including: Response to Restriction Requirement dated Feb. 10, 2020, Restriction Requirement dated Dec. 20, 2019, and Application and Drawings filed Sep. 5, 2018, 66 pages.
Application and Drawings for U.S. Appl. No. 16/561,556, filed Sep. 5, 2019, 25 pages.
German Search Report issued in application No. 102019210970.5 dated Apr. 21, 2020, 6 pages.
Non-Final Office Action for U.S. Appl. No. 16/122,121 dated Jun. 23, 2020, 18 pages.
Application and Drawings for U.S. Appl. No. 16/830,730, filed Mar. 26, 2020, 37 pages.
Prosecution History for U.S. Appl. No. 16/122,121 including: Notice of Allowance dated Sep. 9, 2020 and Amendment dated Aug. 26, 2020, 16 pages.
German Search Report issued in application No. 102020209595.7 dated May 18, 2021 (10 pages).
German Search Report issued in application No. 102020208395.9 dated May 18, 2021 (10 pages).
Restriction Requirement for U.S. Appl. No. 16/561,556 dated Nov. 1, 2021, 6 pages.
German Search Report issued in application No. DE102021200634.5 dated Nov. 5, 2021 (05 pages).
Non-Final Office Action for U.S. Appl. No. 16/561,556, dated Jan. 18, 2022, 16 pages.
Prosecution History for U.S. Appl. No. 16/561,556 including: Non-Final Office Action dated Oct. 7, 2022, and Final Office Action dated Jun. 22, 2022, 32 pages.
Non-Final Office Action for U.S. Appl. No. 16/830,730, dated Dec. 19, 2022, 14 pages.
Final Office Action for U.S. Appl. No. 16/561,556 dated Feb. 1, 2023, 18 pages.
Prosecution History for U.S. Appl. No. 16/803,603 including: Notice of Allowance dated Mar. 30, 2023, Amendment dated Feb. 27, 2023, Non-Final Office Action dated Dec. 1, 2022, Advisory Action dated Sep. 23, 2022, Request for Continued Examination dated Sep. 19, 2022, Amendment After Final dated Aug. 10, 2022, Final Office Action dated Jun. 10, 2022, Amendment dated Feb. 28, 2022, and Non-Final Office Action dated Dec. 21, 2021, 89 pages.
Restriction Requirement for U.S. Appl. No. 16/830,730 dated Oct. 14, 2022, 6 pages.
Notice of Allowance for U.S. Appl. No. 16/561,556, dated Feb. 8, 2024, 14 pages.

* cited by examiner

MACHINE DUMP BODY CONTROL USING OBJECT DETECTION

CROSS-REFERENCE TO RELATED APPLICATION

The present application is a continuation of and claims priority of U.S. patent application Ser. No. 16/803,603, filed Feb. 27, 2020, the content of which is hereby incorporated by reference in its entirety.

FIELD OF THE DESCRIPTION

The present description generally relates to object detection and control systems for mobile work machines. More specifically, but not by limitation, the present description relates to dump body control on a mobile work machine using object detection.

BACKGROUND

There are many different types of work machines. Those work machines can include construction machines, turf management machines, forestry machines, agricultural machines, among others. Many of these pieces of mobile equipment have controllable subsystems, that include mechanisms that are controlled by the operator in performing operations.

For instance, a construction machine can have multiple different mechanical, electrical, hydraulic, pneumatic and electro-mechanical subsystems, among others, all of which can be operated by the operator. Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, excavators, boom lifts, among others.

The discussion above is merely provided for general background information and is not intended to be used as an aid in determining the scope of the claimed subject matter.

SUMMARY

A mobile work machine includes a frame, a material loading system having a material receiving area configured to receive material and an actuator configured to control the material loading system to move the material receiving area relative to the frame, and a control system configured to receive an indication of a detected object, determine a location of the object relative to the material loading system, and generate a control signal that controls the mobile work machine based on the determined location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Mobile work machines operate on worksites that are often complicated, sometimes with many other work machines and workers performing many different operations at any given time. Worksite operations may involve a large number of steps or phases and may be quite complex. Further, the worksite operations often require precise machine control by an operator, and this machine control can be highly repetitive. To further complicate matters, a typical worksite comprises a variety of different hazards or obstacles, generally referred to herein as objects.

The more complicated a worksite gets, the more difficult it can be for an operator of a work machine to complete their task while avoiding collisions with objects, such as another work machine, an above or below ground hazard, a person at the worksite or any other object. For instance, a material loading system of a mobile work machine includes a material receiving area (e.g., a dump body, such as a bucket, container, etc. on a construction machine) that is movable by a dumping actuator to unload the material receiving area. For this dumping operation, an overhead hazard can include an overhead utility, aerial vehicle, drone, building overhang, etc. In many cases, such objects are not easily identifiable by the operator, especially when they are above and/or behind the operator.

The present description generally relates to object detection and control systems for mobile work machines. More specifically, but not by limitation, the present description relates to dump body control on a mobile work machine using object detection.

Figure 1:
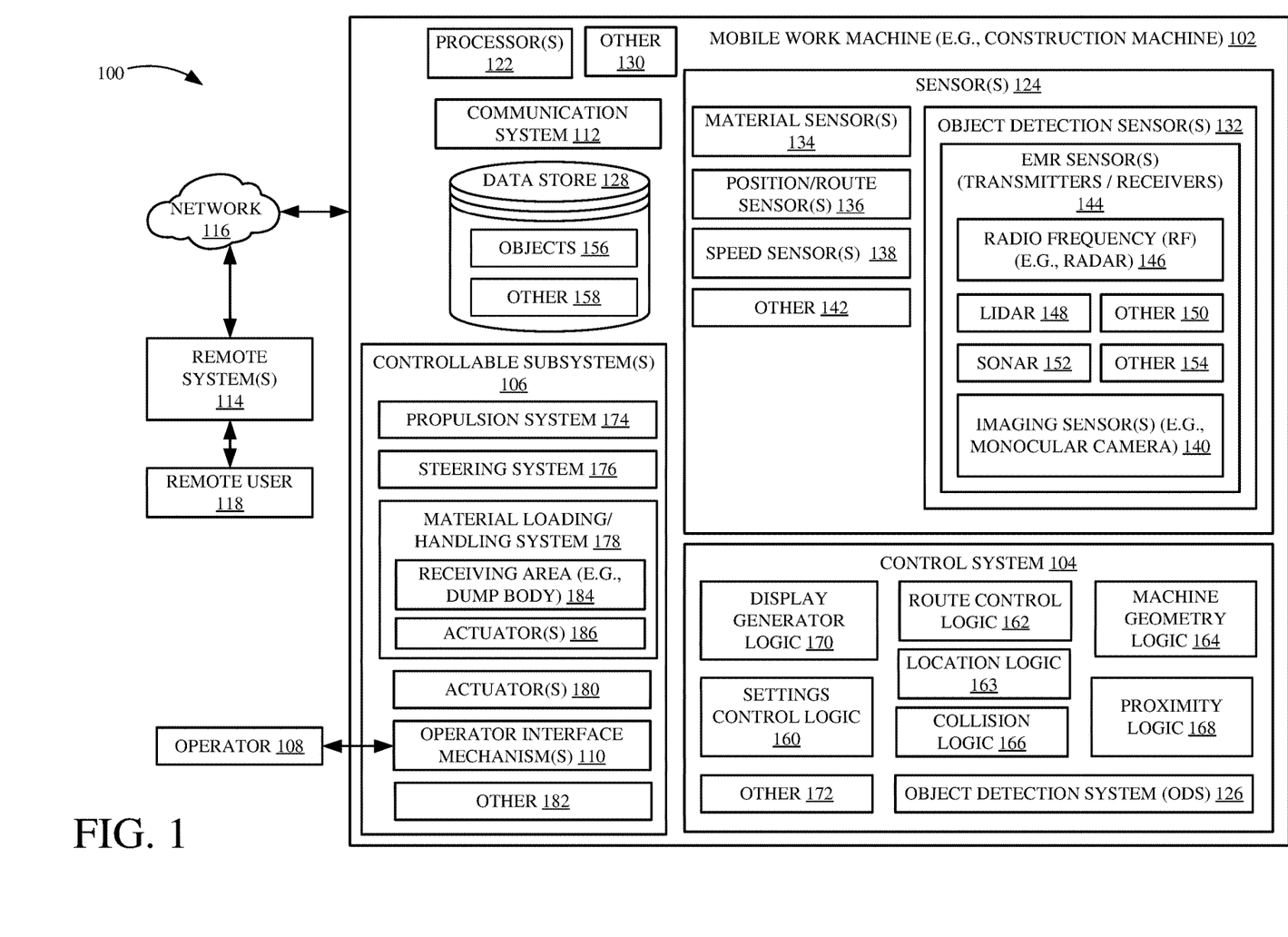
FIG. 1 is a block diagram showing one example of a work machine architecture that includes a mobile work machine.

FIG. 1 is a block diagram showing one example of a work machine architecture 100 that includes a mobile work machine 102 (such as a construction machine, examples of which are discussed below). Work machine 102 includes a control system 104 configured to control a set of controllable subsystems 106 that perform operations on a worksite. For instance, an operator 108 can interact with and control work machine 102 through operator interface mechanism(s) 110. Operator interface mechanism(s) 110 can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Work machine 102 includes a communication system 112 configured to communicate with other systems or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

A remote user 118 is illustrated as interacting with remote system 114, such as to receive communications from or send communications to work machine 102 through communication system 112. For example, but not by limitation, remote user 118 can receive communications, such as notifications, requests for assistance, etc., from work machine 102 on a mobile device.

FIG. 1 also shows that work machine 102 includes one or more processors 122, one or more sensors 124, an object detection system 126, a data store 128, and can include other items 130 as well. Sensor(s) 124 can include any of a wide variety of sensors depending on the type of work machine 102. For instance, sensors 124 can include object detection sensor(s) 132, material sensors 134, position/route sensors 136, speed sensors 138, worksite imaging sensors 140, and can include other sensors 142 as well.

Material sensors 134 are configured to sense material being moved, processed, or otherwise worked on by work machine 102. Position/route sensors 136 are configured to identify a position of work machine 102 and a corresponding route (e.g., heading) of work machine 102 as it traverses the worksite. Sensors 136 include sensors configured to generate signals indicative of an angle or turn radius of machine 102. This can include, but is not limited to, steering angle sensors, articulation angle sensors, wheel speed sensors, differential drive signals, gyroscopes, to name a few.

Speed sensors 138 are configured to output a signal indicative of a speed of work machine 102. Worksite imaging sensors 140 are configured to obtain images of the worksite, which can be processed to identify objects or conditions of the worksite. Examples of imaging sensor(s) 140 include, but are not limited to, one or more cameras (e.g., a monocular camera, stereo camera, etc.) that obtains still images, a time-series of images, and/or video feed of an area of a worksite. For instance, the field of view (FOV) of the camera can include any area of interest on the worksite. This can include areas above and/or to the rear of machine 102, and which may not otherwise be visible to operator 108 while in the operator compartment or cab of machine 102.

The camera can include any suitable image acquisition system including, but not limited to, an area array device such as a charge couple device (CCD) or a complementary metal oxide semi-conductor (CMOS) image device. Further, the camera can be coupled to any suitable optical system to increase or decrease the field of view under control of control system 104. Further still, the camera may be provided with additional illumination, such as a backup light, or dedicated illuminator, such that images can easily be acquired when excavator is operated in low-light conditions. Further still, in one example multiple cameras are used to provide stereo vision. In this way, using stereo vision techniques, three-dimensional imagery and visual odometry can be employed.

Object detection sensors 132 can include electromagnetic radiation (EMR) sensors (e.g., transmitters, receivers, transceiver(s)) 144. Examples of EMR sensors include imaging sensors 140 (discussed above), radio frequency (RF) devices 146 (such as RADAR), LIDAR devices 148, and can include other devices 150 as well. Object detection sensors 132 can also include sonar devices 152, and can include other devices 154 as well.

Control system 104 interacts with data store 128 (e.g., storing or retrieving data). Data store 128 can store a variety of information on the worksite and the objects/terrain of the worksite. Illustratively shown, data store 128 includes object data 156, can include other data as well, as indicated by block 158.

Object data 156 includes data related to the various objects in the worksite (e.g., work machine 102, other work machines, operator 108, hazards, etc.). For instance, object data 156 can include position data identifying positions of the objects in the worksite. For example, this can include the GPS coordinates or local coordinates of the objects and/or the vertical portion of the object relative to the ground. Position data for the objects can be used by control system 104 to avoid collisions between objects.

Additionally, object data 156 can include the dimensions of the objects in the worksite. For example, the physical dimensions of an object. For instance, work machine 102, in one example, is thirteen feet long by eight feet wide by nine feet high. Dimensions of objects in the worksite can be used by control system 104 to prevent collisions between objects.

Also, object data 156 can include pose data of the objects in the worksite. For example, pose data for an object includes positions and dimensions of its components. For instance, pose data for work machine 102 can include the positions of various components (e.g., dump body, bucket, etc.) relative to a frame and/or other components. Pose data of objects in the worksite can be used by control system 104 to prevent collisions between objects with greater precision than standard dimensions alone. For example, work machine 102 in one pose at a given location may not cause a collision, but work machine 102 in a different pose at the same location, may cause a collision.

As illustrated, control system 104 includes settings control logic 160, route control logic 162, location logic 163, machine geometry logic 164, collision logic 166, proximity logic 168, display generator logic 170, and it can include other items 172. Controllable subsystems 106 can include propulsion system 174, steering system 176, material loading (or handling) system 178, one or more different actuators 180 (e.g., that can be used to change machine settings, machine configuration, etc.), and it can include a wide variety of other systems 182.

As illustrated, material loading system 178 includes a material receiving area 184, and one or more actuator(s) 186 configured to move (e.g., load/unload) the material receiving area. Material receiving area 184 is configured to receive material (e.g., soil, building materials, etc.), and can take a wide variety of different forms depending on the type of machine 102. For instance, in the case of a dump vehicle (e.g., rear or side dump truck), material receiving area 184 comprises a pivotable (or otherwise moveable) dump body. In the case of an excavator, material receiving area 184 comprises a bucket supported on an articulated arm.

In one example, controllable subsystems 106 also include operator interface mechanism(s) 110, such as display devices, audio output devices, haptic feedback mechanisms, as well as input mechanisms. Examples are discussed in further detail below.

Settings control logic 160 can control one or more of subsystems 106 in order to change machine settings based upon objects, conditions, and/or characteristics of the worksite. By way of example, settings control logic 160 can actuate actuator(s) 180 and/or 186 that change the operation of propulsion system 174, steering system 176, and/or material loading system 178.

Route control logic 162 can control steering system 176. By way of example, but not by limitation, if an object is detected by object detection system 126, route control logic 162 can control propulsion system 174 and/or steering system 176 to avoid the detected object. Location logic 163 determines a location of machine 102 on the worksite.

Machine geometry logic 164 retrieves physical dimensions of work machine 102 and its controllable subsystems 106, and sensor signals from sensors 124. Machine geometry logic 164 uses this data to determine the pose of work machine 102 (e.g., the orientation and positions of work machine 102 and all of its controllable subsystems 106). The pose of work machine 102 can be useful in determining if a portion of work machine 102 will collide with another object.

Collision logic 166 is operably or communicatively coupled to settings control logic 160, route control logic 162, location logic 163, machine geometry logic 164, and/or a source of external object locations to gather information used to determine if work machine 102 will collide with another object. Before control logic 160 and/or 162 sends control signals, collision logic 166 can determines if the potential action will cause a collision with an external object and, if so, prevent the actuating signal from being sent. For example, collision logic 166 can simulate the requested actuation and determine if the actuation will cause an intersection of objects. If so, there will be a collision and the actuation is prevented.

Similar to collision logic 166, proximity logic 168 is coupled to settings control logic 160, route control logic 162, location logic 163, machine geometry logic 164, and/or a source of external object locations to gather information used to determine if work machine 102 will collide with another object. Proximity logic 168, however, determines that work machine 102 is within a threshold distance of an external object and prevents work machine 102 from moving within a threshold distance of an object. The threshold distance can be variable based on the type of object. For example, a threshold distance from an overhead power line may be twenty feet, while the threshold distance to a tree may be five feet.

Display generator logic 170 illustratively generates a control signal to control a display device, to generate a user interface display for operator 108. The display can be an interactive display with user input mechanisms for interaction by operator 108.

Object detection system 126 is configured to receive signals from object detection sensor(s) 132 and, based on those signals, detect objects proximate machine 102 on the worksite, such as in a path of machine 102. Object detection system 126 can therefore assist operator 108 in avoiding objects while moving machine 102 along the worksite (e.g., backing up) and/or moving receiving area 184 (e.g., while transporting/unloading/dumping material). Before discussing object detection system 126 in further detail, examples of mobile work machines will be discussed with respect to FIGS. 2-4.

Figure 2:
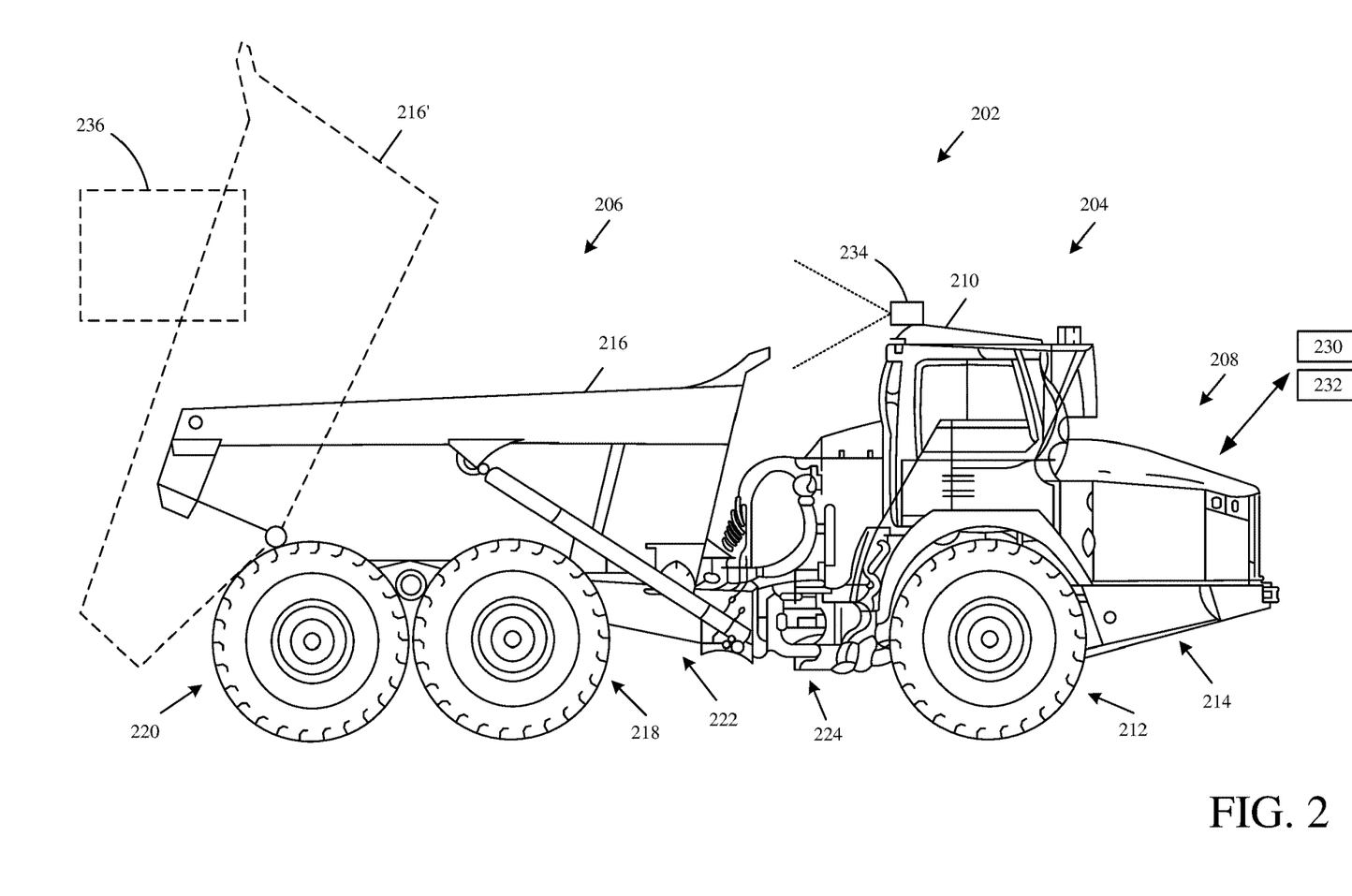
FIG. 2 is a pictorial illustration showing one example of a mobile work machine.

As noted above, mobile work machines can take a wide variety of different forms. FIG. 2 illustrates one example of a mobile work machine 202, in the form of an off-road construction vehicle (illustratively a rear dump vehicle or truck). Machine 202 includes a power head section 204 and a load carrying section 206. The power head section 204 includes a vehicle engine or motor 208, an operator cab 210 and a front axle and wheels 212 which are all coupled to a front frame 214. The load carrying section 206 includes a dump body 216, a first rear axle and wheels 218 and a second rear axle and wheels 220 which are all coupled to a rear frame 222. The front frame 214 of the power head section 204 is coupled to the rear frame 222 of the load carrying section 206 by articulation and oscillation joints 224. The articulation joint enables the power head section 204 and the load carrying section 206 to pivot relative to one another about a vertical axis for steering machine 202, and the oscillation joint allows the power head section 204 and the load carrying section 206 to rotate relative to one another about a longitudinal axis extending along the length of machine 202. The dump body 216 is illustrated with dashed lines as dump body 216' when in the dump position.

Machine 202 includes an object detection system 230 (e.g., system 126) and a control system 232 (e.g., system 104). Object detection system 230 detects objects located within a range of machine 202. In the illustrated example, system 230 receives signals from object detection sensor(s) 234 (e.g., sensor(s) 132) which are mounted to detect objects to a rear and/or above dump body 216. The components of system 230 and/or system 232 communicate over a CAN network of machine 202, in one example.

Object detection sensor(s) 234 are configured to generate a signal indicative of a detected object (represented generally at block 236) and a location of the detect object relative to dump body 216 (or other portions of machine 202). For instance, sensor 234 can comprise an imaging sensor or camera. Alternatively, or in addition, sensor(s) 234 can be configured to transmit a detection signal toward the rear of machine 202 and receives reflections of the detection signal to detect object 236 behind machine 202. In one example, the detection signal comprises electromagnetic radiation transmitted to the rear of machine 200. For instance, this can include radio frequency (RF) signals. Some particular examples include radar and LORAN, to name a few. In other examples, object detection sensor(s) 234 utilize sonar, ultrasound, as well as light (e.g., LIDAR) to image objects. Example LIDAR systems utilize ultraviolet light, visible light, and/or near infrared light to image objects.

Of course, other types of object detectors can be utilized. In any case, object detection system 230 generates outputs indicative of objects, which can be utilized by control system 232 to control operation of machine 202.

Figure 3:
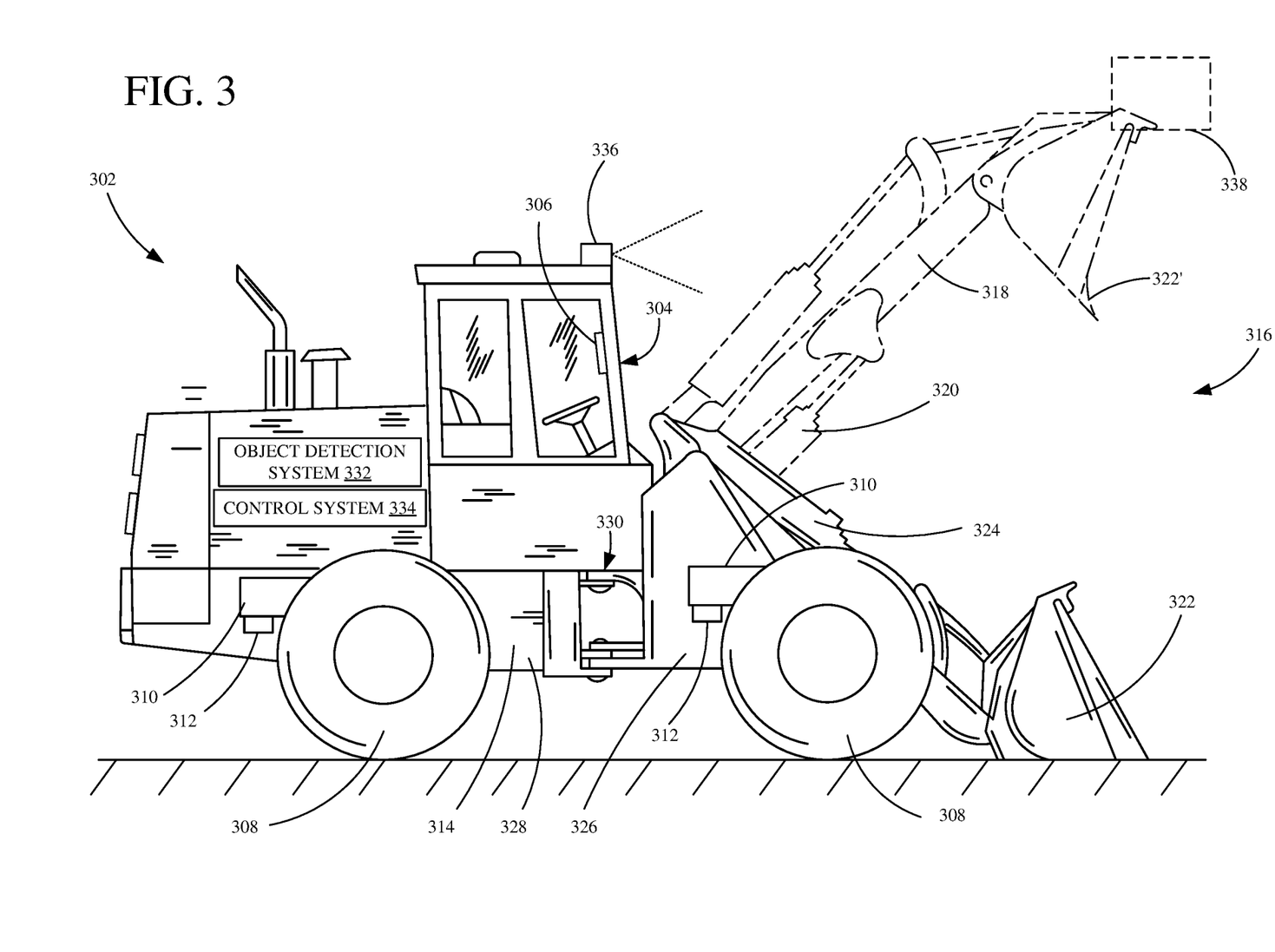
FIG. 3 is a pictorial illustration showing one example of a mobile work machine.

FIG. 3 illustrates another example of a mobile work machine 302, in the form of an off-road construction vehicle (illustratively a front or wheel loader). Machine 302 includes a cab 304 having a display device 306, ground-engaging element(s) 308 (e.g., wheels), motor(s) 310, speed sensor(s) 312, a frame 314, and a boom assembly 316. Boom assembly 316 includes a boom 318, a boom cylinder 320, a bucket 322 and a bucket cylinder 324. Boom 318 is pivotally coupled to frame 314 and may be raised and lowered by extending or retracting boom cylinder 320. FIG. illustrates bucket 322 in an unloading or dump position 322'.

Bucket 322 is pivotally coupled to boom 318 and may be moved through an extension or retraction of bucket cylinder 324. During operation, mobile machine 302 can be controlled by an operator within cab 304 in which mobile machine 302 can traverse a worksite. In one example, each one of motor(s) 310 are illustratively coupled to, and configured to drive, wheel(s) 308 of mobile machine 302. Speed sensor(s) 312 are illustratively coupled to each one of motor(s) 310 to detect a motor operating speed.

In the illustrated example, machine 302 comprises an articulating body where a front portion 326 is pivotably connected to a rear portion 328 at a pivot joint 330. An articulation sensor can be utilized to determine the articulation angle, at pivot joint 330, which can be used to determine the path of machine 302. In another example in which the body of machine 302 is non-articulating, the angle of the front and/or rear wheels 308 is rotatable relative to the frame.

Machine 302 includes an object detection system 332 and a control system 334. In one example, systems 332 and 334 are similar to systems 230 and 232 illustrated in FIG. 2. Object detection system 332 detects objects located within a range of machine 302. In the illustrated example, system 332 receives signals from object detection sensor(s) 336 (e.g., sensor(s) 132) which are mounted to detect objects 338 above (or at least potentially in the path of) bucket 322.

Figure 4:
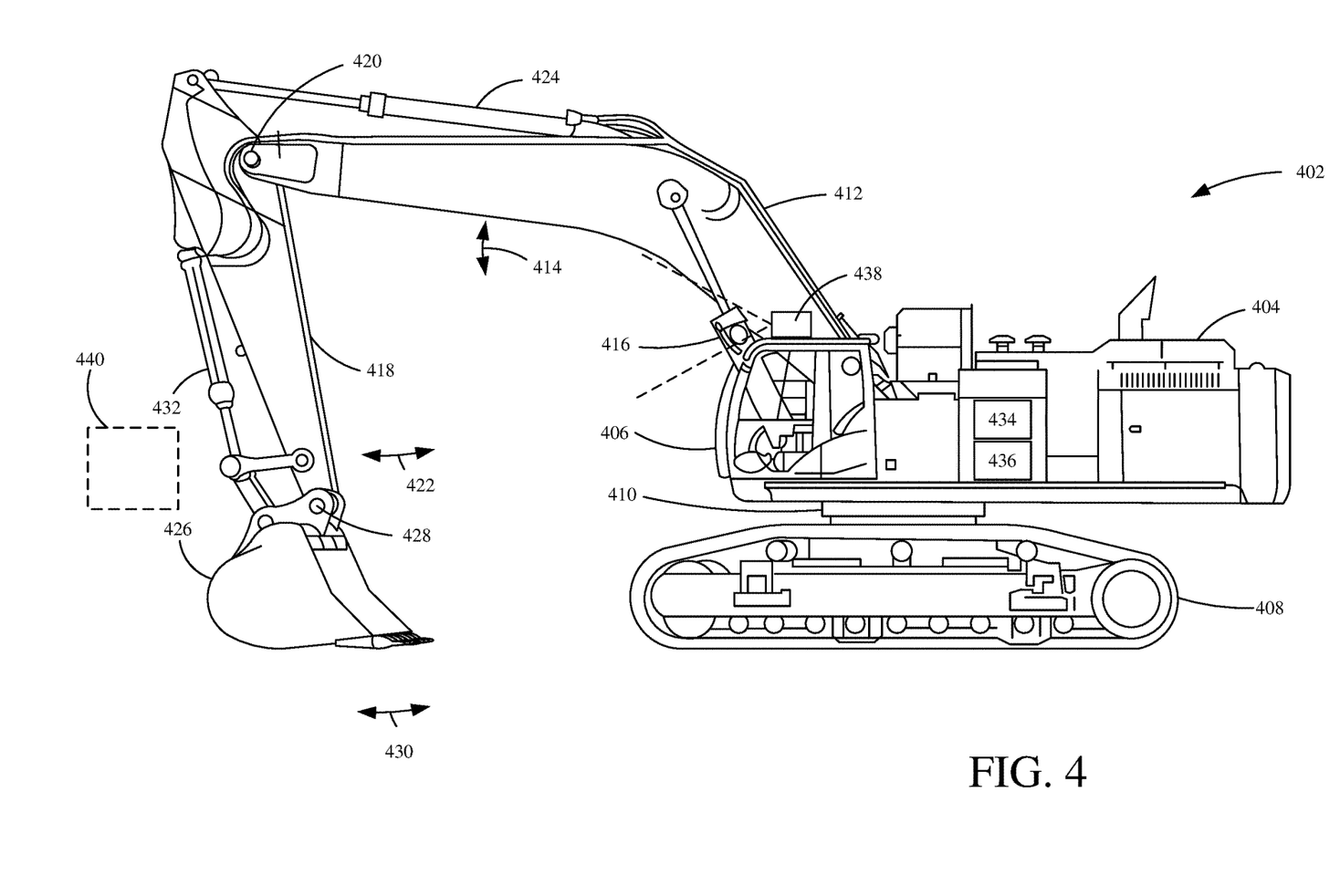
FIG. 4 is a pictorial illustration showing one example of a mobile work machine.

FIG. 4 illustrates another example of a mobile work machine 402, in the form of an off-road construction vehicle (illustratively a hydraulic excavator). Machine 402 includes a house 404 having an operator cab 406 rotatably disposed above tracked portion 408. House 404 may rotate three-hundred sixty degrees about tracked portion 408 via rotatable coupling 410. A boom 412 extends from house 404 and can be raised or lowered in the direction indicated by arrow 414 based upon actuation of hydraulic cylinder 416. A stick 418 is pivotably connected to boom 412 via joint 420 and is movable in the direction of arrows 422 based upon actuation of hydraulic cylinder 424. Bucket 426 is pivotably coupled to stick 418 at joint 428 and is rotatable in the direction of arrows 430 about joint 428 based on actuation of hydraulic cylinder 432.

When an operator within cab 406 needs to move boom 412, he or she engages suitable controls and, in one example, can automatically activate a camera which provides a camera image, on a display within cab 406, corresponding to field of view of an area in which boom 412 is moving or will be moving for the operator's commanded movement.

Machine 302 includes an object detection system 434 and a control system 436. In one example, systems 434 and 436 are similar to systems 230 and 232 illustrated in FIG. 2. Object detection system 434 detects objects located within a range of machine 402. In the illustrated example, system 434 receives signals from object detection sensor(s) 438 (e.g., sensor(s) 132) which are mounted to detect objects 440 above (or at least potentially in the path of) boom 412.

Figure 5:
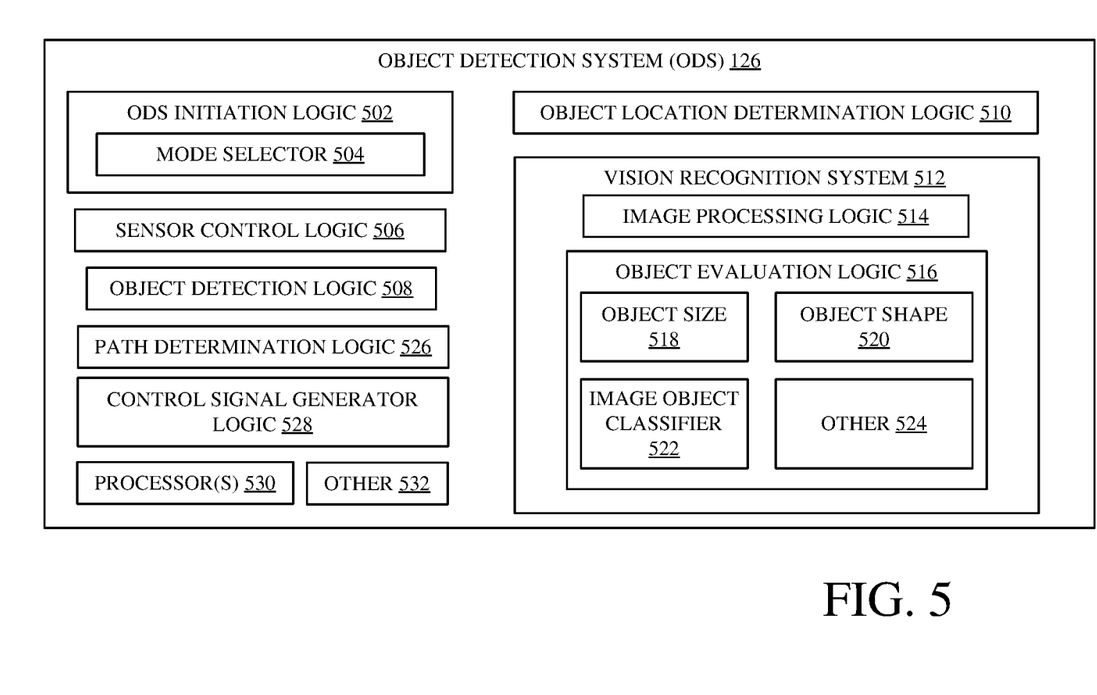
FIG. 5 is a block diagram illustrating one example of an object detection system.

FIG. 5 illustrates one example of object detection system 126. For sake of illustration, but not by limitation, object detection system 126 will be described in the context of mobile work machine 102 illustrated in FIG. 1.

System 126 includes initiation logic 502 configured to initiate and control object detection performed by system 126. For example, this can be in response to a mode selector 504 determining that the machine 102 has entered a particular mode for which system 126 is to be initiated. For example, this can be in response to determining that system 178 is being moved or otherwise being actuated (or preparing to be moved or actuated), by sensing operator inputs and/or machine settings.

Sensor control logic 506 is configured to control object detection sensors 132 to detect any objects in a projected path of system 178. This can include controlling imaging sensors (e.g., cameras) 140 to acquire images. In another example, logic 506 controls sensor(s) 144 to transmit detection signals and to receive corresponding reflections of the detection signal. The signals from sensors 132 are used by object detection logic 508 to detect the presence of objects (e.g., objects 236, 338, 440) on the worksite. Object location determination logic 510 is configured to determine a location of the object(s) detected by logic 508.

In one example, a vision recognition system 512 is configured to perform vision recognition on acquired images, to evaluate the objects detected by logic 508. Illustratively, system 512 includes image processing logic 514 is configured to perform image processing on the image and object evaluation logic 516 is configured to evaluate the object based on the image processing performed by logic 514. This can include, but is not limited, object size detection 518, object shape detection 520, object classification performed by an object classifier 522, and can include other items 524 as well.

Path determination logic 526 is configured to determine a path of system 178 (e.g., movement of receiving area 184) and/or other components of machine 102, and control signal generator logic 528 is configured to generate control signals, either by itself or in conjunction with control system 104. System 126 is illustrated as having one or more processors 530, and can include other items 532 as well.

Figure 6:
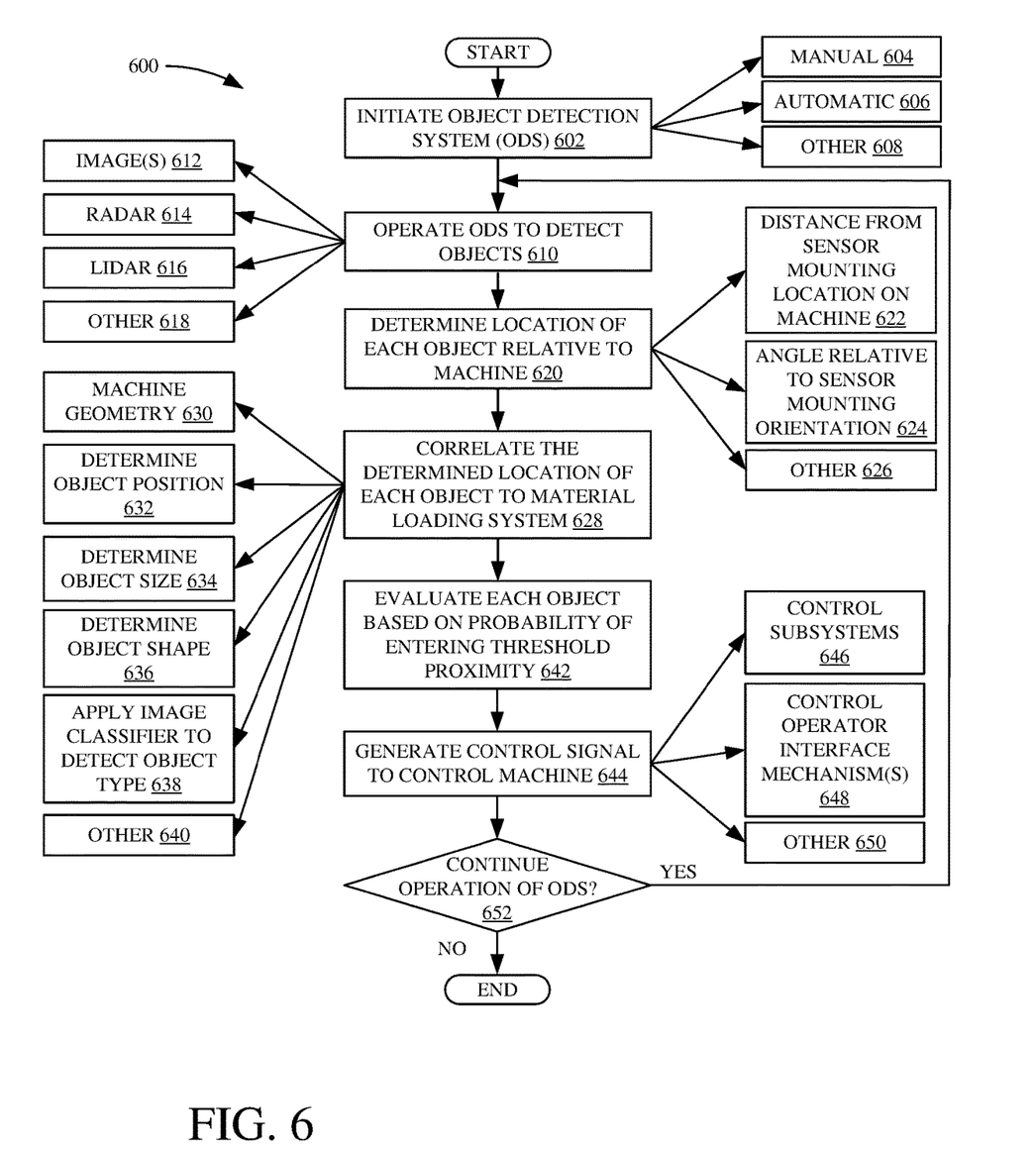
FIG. 6 is a flow diagram illustrating an example operation of an object detection system.

FIG. 6 illustrates a flow diagram 600 of an example operation of object detection system 126. For sake of illustration, but not by limitation, FIG. 6 will be described in the context of mobile work machine 102 shown in FIG. 1.

At block 602, initiation logic 502 initiates object detection. This can be in response to a manual input by operator 108, such as operator 108 actuating an input mechanism. This is represented by block 604. Alternatively, or in addition, the object detection can be initiated automatically, such as in response to logic 502 detecting that machine 102 has entered a particular operating mode, such as being shifted into reverse, activating/actuating material loading system 178 (e.g., lifting dump body 216, bucket 322, boom 412, etc.). This is represented by block 606. Of course, the object detection can be initiated in other ways as well. This is represented by block 608.

At block 610, sensor control logic 506 controls object detection sensor(s) 132 to detect objects on the worksite. This can include objects that are at or close to the ground level, as well as above-ground objects such as trees, power lines, building overhangs, building ceilings, etc. This can be done in any of a number of ways. For example, images can be obtained from imaging sensor(s) 140. This is represented by block 612. In another example, a radar transmitter can transmit a radar signal, represented by block 614. Alternatively, or in addition, a detection signal can comprise a LIDAR device. This is represented by block 616. Of course, other types of detection can be performed as well. This is represented by block 618.

Object location determination logic 510 receives the sensor signals (or representations of the sensor signals) that are indicative of the detected objects and determines locations of each object relative to machine 102. This is represented by block 620.

In one example of block 620, logic 510 determines a distance of the object from the sensor mounting location on machine 102. This is represented by block 622. For example, in the example of FIG. 2, system 230 determines a distance of object 236 from sensor 234.

Logic 510 also can determine an angle of the detected object relative to the sensor mounting orientation. This is represented by block 624. Using the received information, logic 510 determines the position of the object relative to machine 102 and/or the worksite itself. Of course, the location of each object can be determined in other ways as well. This is represented by block 626.

Using this information, the location of each detected object can be correlated to the current position and/or projected movement path of material loading system 178. This is represented by block 628. For example, path determination logic 526 can utilize machine geometry logic 164 to determine the path of system 178 for a commanded movement. This is represented by block 630. In the example of FIG. 2, this includes logic 526 determining the path of dump body 216 as it moves from the loaded position to the unloading or dumping position 216′.

In one example, the correlation can be determined based on the object position (block 632), object size (block 634), and/or object shape (block 636). Also, in one example an image classifier is applied to detect and object type. This is represented by block 638. In one example, vision recognition system 512 can be configured to apply image object classifier 522 to determine whether the detected object is a person, a utility line (high voltage power line, etc.), a tree, a building, etc. In one example, the type of object is utilized to select a threshold proximity for collision avoidance. As mentioned above, if the object is a high voltage power line, the threshold may be set at twenty feet whereas if the object is a tree, the threshold may be set at five feet. Of course, these are for sake of example only. Of course, the location of each object can be correlated to the machine position in other ways as well. This is represented by block 640.

At block 642, each object is evaluated based on a probability of entering the threshold proximity. Based on this determination, a control signal is generated to control the machine at block 644. Machine 102 can be controlled in any of a number of ways. In one example, one or more of controllable subsystems 106 is controlled by control signal generator logic 528 and/or control system 104. This is represented by block 646.

For example, control system 104 can automatically move system 178 to avoid collision with the object. In another example, a threshold position of system 178 can be set to avoid collision with the object. For sake of illustration, but not by limitation, in the example of FIG. 2 block 646 can set a threshold dump position of seventy-five percent (or otherwise) so that the dump body 216 cannot be raised above a height that would result in contact (or entering the threshold distance to) object 236. Of course, this is for sake of example only. In another example, propulsion system 174 and/or steering system 176 can be automatically controller to avoid contact with the object (e.g., automatically braking or stopping the wheels, stopping the engine, shifting gears, etc.).

Alternatively, or in addition, operator interface mechanisms can be controller to render visual, audio, haptic, or other types of outputs to operator 108, indicative of the detected object(s). This is represented by block 648. For example, a visual warning can be generated on a display device to operator 108 to indicate that system 178 is approaching the detected object. In one example, the visual indication can comprise an augmented video feed from the camera showing the object in the camera field of view. The display can be augmented in any of a number of ways, such as, but not limited to, highlighting the object on the display. Alternatively, or in addition, an audible warning can also be generated, and can change volume (or otherwise) based on a detected distance to the object (i.e., the audible alarm becomes louder as machine 102 approaches the object). In another example, haptic feedback in the form of a seat and/or steering wheel vibration can be provided to operator 108.

Of course, control signal(s) can be generated to control machine 102 (and/or other machines/systems) in other ways as well. This is represented by block 650. Block 652 determines whether to continue object detection. This is can be done automatically, manually, or otherwise.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
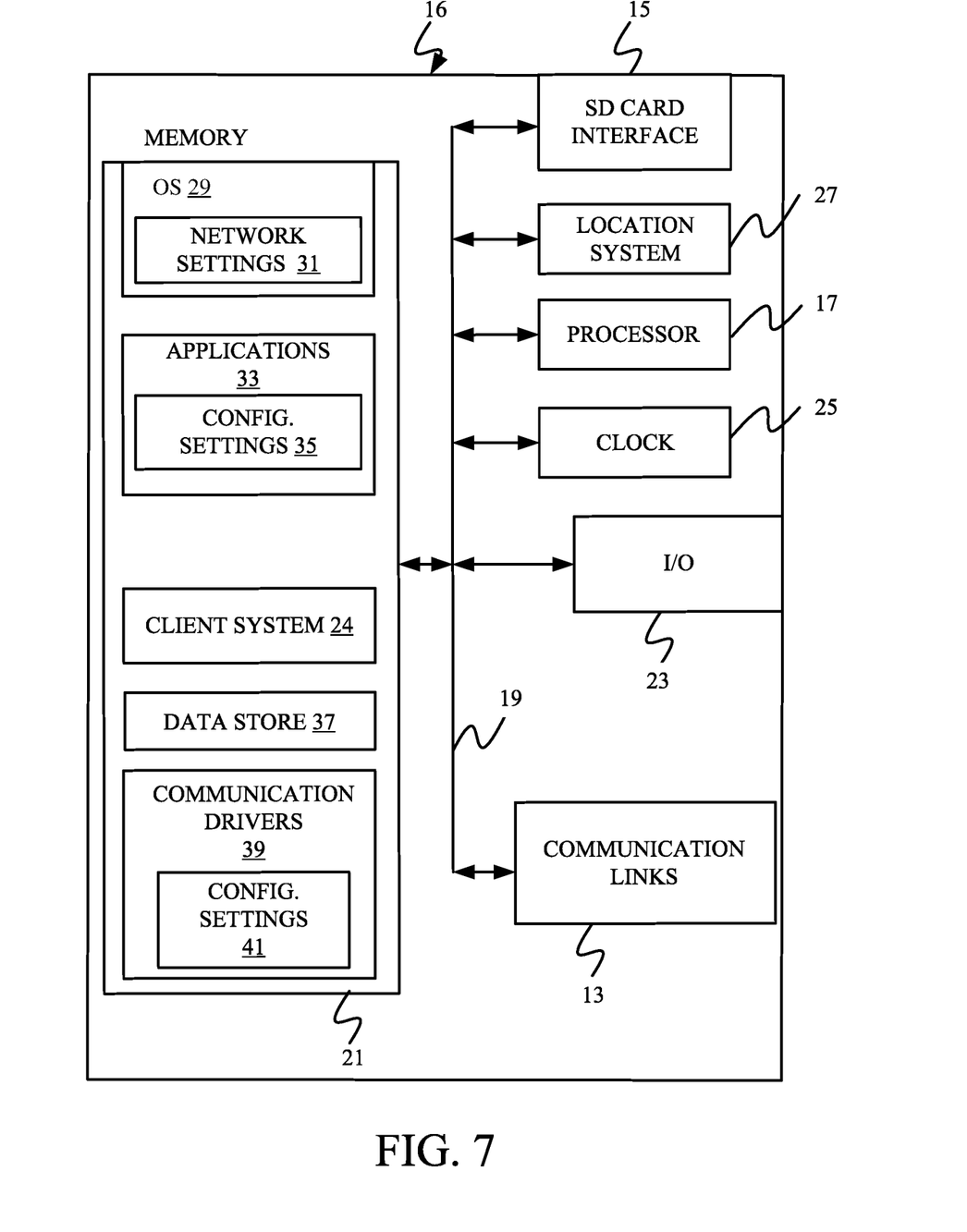
FIG. 7 shows an example of a mobile device that can be used in the architecture(s) shown in the previous figures.

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of work machine 102 or as remote system 114.

FIG. 7 provides a general block diagram of the components of device 16 that can run some components shown in FIG. 1, that interacts with them, or both. In device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of device 16 include, but are not limited to, a smart phone or tablet computer having a user interface display screen, such as a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. The computer can also illustratively receive voice inputs as well. Of course, of forms of devices 16 are possible.

Figure 8:
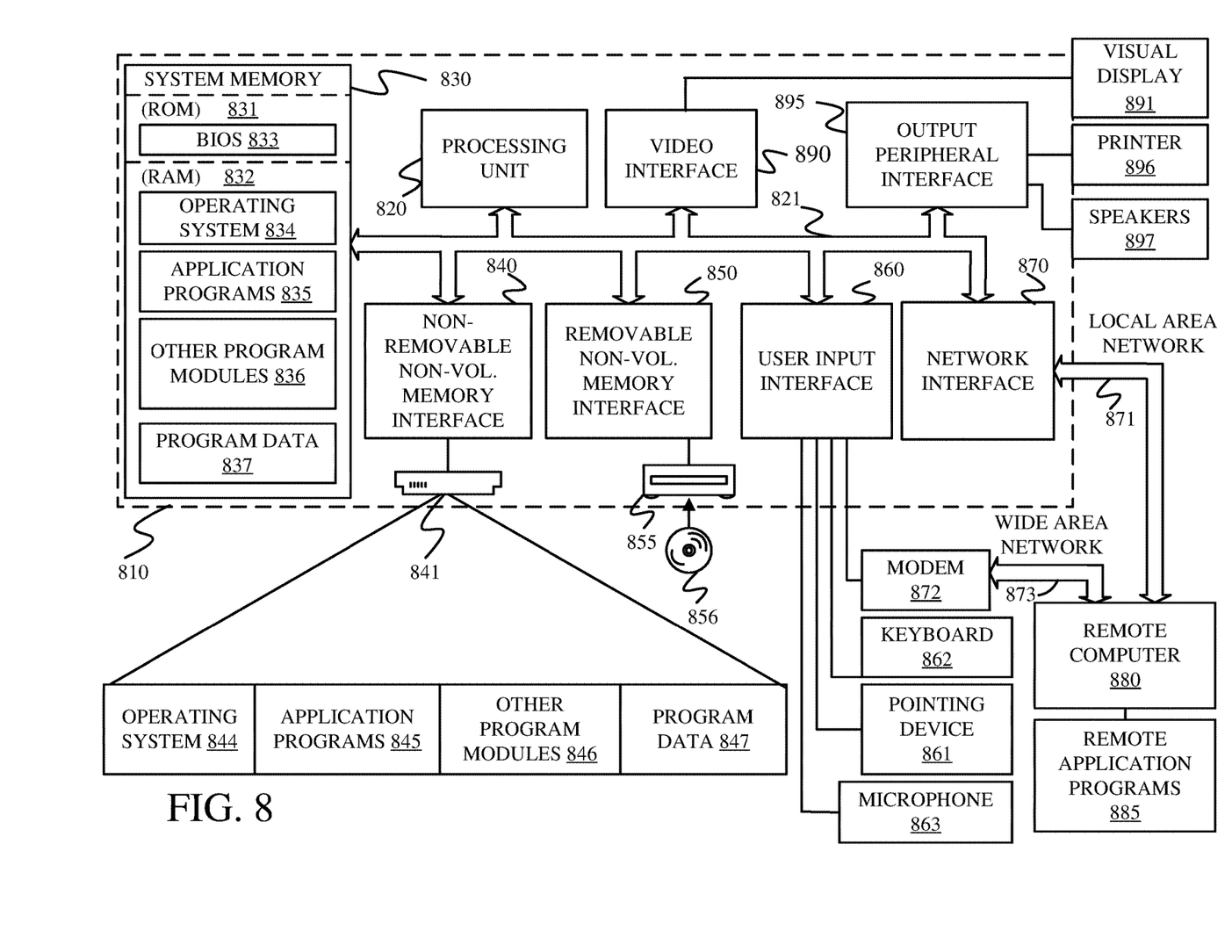
FIG. 8 is a block diagram showing one example of a computing environment that can be used in the architecture(s) shown in the previous figures.

FIG. 8 is one example of a computing environment in which elements of FIG. 1, or parts of it, (for example) can be deployed. With reference to FIG. 8, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile work machine comprising:
a frame;
a material loading system having a material receiving area configured to receive material and an actuator configured to control the material loading system to move the material receiving area relative to the frame; and
a control system configured to:
receive an indication of a detected object;
determine a location of the object relative to the material loading system; and
generate a control signal that controls the mobile work machine based on the determined location.

Example 2 is the mobile work machine of any or all previous examples, wherein the mobile work machine comprises a construction machine.

Example 3 is the mobile work machine of any or all previous examples, wherein the construction machine comprises a dump truck.

Example 4 is the mobile work machine of any or all previous examples, wherein the material receiving area comprises a bucket.

Example 5 is the mobile work machine of any or all previous examples, wherein the construction vehicle comprises one of an excavator or a loader.

Example 6 is the mobile work machine of any or all previous examples, wherein the material receiving area comprises a dump body.

Example 7 is the mobile work machine of any or all previous examples, wherein the actuator comprises a dumping actuator configured to move the dump body, and the control signal controls the dumping actuator.

Example 8 is the mobile work machine of any or all previous examples, wherein the control system comprises:
collision logic configured to receive a commanded movement from an operator and determine whether the commanded movement will result in contact between the material loading system and the detected object; and
control logic configured to generate the control signal to prevent the contact between the material loading system and the detected object.

Example 9 is the mobile work machine of any or all previous examples, wherein the control signal controls the dumping actuator to limit movement of the material loading system.

Example 10 is the mobile work machine of any or all previous examples, and further comprising a set of ground engaging elements movably supported relative to the frame, wherein the control signal controls at least one of a propulsion system or a steering system that controls the set of ground engaging elements.

Example 11 is the mobile work machine of any or all previous examples, wherein the control signal controls a user interface mechanism to provide an output to the user, the output indicating the location of the object relative to the material loading system.

Example 12 is the mobile work machine of any or all previous examples, wherein the output comprises at least one of:
a display output;
an audible output; or
a haptic output.

Example 13 is the mobile work machine of any or all previous examples, and further comprising:
an object detection system configured to receive a signal from an object detection sensor and to detect the object based on the signal.

Example 14 is the mobile work machine of any or all previous examples, wherein the object detection sensor comprises an imaging sensor.

Example 15 is the mobile work machine of any or all previous examples, wherein the signal comprises a radio frequency (RF) signal.

Example 16 is a computer-implemented method of controlling a mobile work machine, the method comprising:
receiving an indication of a detected object on a worksite;
determining a location of the object relative to a material loading system of the mobile work machine, the material loading system having a material receiving area configured to receive material and an actuator configured to control the material loading system to move the material receiving area relative to the frame; and generating a control signal that controls the mobile work machine based on the determined location.

Example 17 is the computer-implemented method of any or all previous examples, wherein the mobile work machine comprises a construction machine, and further comprising:
receiving a commanded movement from an operator;
determining whether the commanded movement will result in contact between the material loading system and the detected object; and
generating the control signal to prevent the contact between the material loading system and the detected object.

Example 18 is a control system for a mobile work machine, the control system comprising:
an object detection system configured to:
receive a signal from an object detection sensor and to detect an object based on the signal; and
determine a location of the object relative to a material loading system of the mobile work machine, the material loading system having a material receiving area configured to receive material and an actuator configured to control the material loading system to move the material receiving area relative to the frame;
collision logic configured to receive a commanded movement from an operator and determine whether the commanded movement will result in contact between the material loading system and the detected object; and
control logic configured to generate the control signal to prevent the contact between the material loading system and the detected object.

Example 19 is the control system of any or all previous examples, wherein the mobile work machine comprises a construction machine.

Example 20 is the control system of any or all previous examples, wherein the material receiving area comprises a dump body, and the actuator comprises a dumping actuator configured to move the dump body, and the control signal controls the dumping actuator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine comprising:
   a controllable subsystem having a movable component that supports a material receiver configured to receive material;
   an actuator configured to move the controllable subsystem; and
   a control system configured to:
   determine a location of a detected object relative to the mobile work machine;
   define a threshold distance based on an object type of the detected object;
   receive an indication of a commanded movement of the actuator to move a portion of the controllable subsystem to a target position that is within the threshold distance from the location of the detected object; and
   generate a control signal that controls the mobile work machine based on the indication.

2. The mobile work machine of claim 1, wherein the mobile work machine comprises a construction machine.

3. The mobile work machine of claim 2, wherein the material receive comprise a bucket.

4. The mobile work machine of claim 2, wherein the construction machine comprises a dump truck.

5. The mobile work machine of claim 4, wherein the construction machine comprises one of an excavator or a loader.

6. The mobile work machine of claim 1, wherein the material receiver comprises a dump body.

7. The mobile work machine of claim 6, wherein the actuator comprises a dump actuator configured to move the dump body, and the control signal controls the dump actuator.

8. The mobile work machine of claim 1, wherein the control system is configured to:
   determine the object type by applying an object classifier to an image of the detected object.

9. The mobile work machine of claim 1, and further comprising a set of ground engaging elements movably supported relative to a frame, wherein the control signal controls at least one of a propulsion system or a steering system that controls the set of ground engaging elements.

10. The mobile work machine of claim 1, wherein the control signal controls a user interface mechanism to provide an output to a user, the output indicating the location of the detected object relative to the mobile work machine, and wherein the output comprises at least one of:
    a display output;
    an audible output; or
    a haptic output.

11. The mobile work machine of claim 1, and further comprising:
    an object detection system configured to receive a signal from an object detection sensor and to detect the detected object based on the signal.

12. The mobile work machine of claim 11, wherein the object detection sensor comprises an imaging sensor.

13. The mobile work machine of claim 11, wherein the signal comprises a radio frequency (RF) signal.

14. The mobile work machine of claim 1, wherein the control signal controls the actuator to limit movement of the controllable subsystem.

15. The mobile work machine of claim 14, wherein the control signal controls the actuator to prevent contact between the controllable subsystem and the detected object.

16. A computer-implemented method of controlling a mobile work machine, the computer-implemented method comprising:
    determining a location of a detected object relative to the mobile work machine;
    defining a threshold distance based on an object type of the detected object;
    receiving an indication of a commanded movement of an actuator to move a portion of a controllable subsystem to a target position that is within the threshold distance from the location of the detected object; and
    generating a control signal that controls the mobile work machine based on the indication.

17. The computer-implemented method of claim 16, wherein the mobile work machine comprises a construction machine, the actuator comprises a dump actuator configured to move a dump body, and generating the control signal comprises controlling the dump actuator.

18. The computer-implemented method of claim 16, wherein generating the control signal comprises:

controlling at least one of a propulsion system or a steering system that controls a set of ground engaging elements of the mobile work machine.

19. The compute implemented method of claim 16, wherein generating the control signal comprises:
controlling a user interface mechanism to provide an output to a user, the output indicating the location of the detected object relative to the mobile work machine, and wherein the output comprises at least one of:
a display output;
an audible output; or
a haptic output.

20. A control system for a mobile work machine, the control system comprising:
an object detection system configured to:
receive a signal from an object detection sensor;
detect an object based on the signal; and
determine a location of the object relative to a controllable subsystem having an actuator configured to move a material receiver;
collision logic configured to:
define a threshold distance based on an object type of the object; and
receive an indication of a commanded movement of the actuator to move a portion of the controllable subsystem to a target position that is within the threshold distance from the location of the object; and
control logic configured to generate a control signal based on the indication.

* * * * *